US012633304B2

(12) United States Patent
Kamai et al.

(10) Patent No.: US 12,633,304 B2
(45) Date of Patent: May 19, 2026

(54) DYSARTHRIA DETECTION METHOD, DYSARTHRIA DETECTION DEVICE, AND RECORDING MEDIUM

(71) Applicant: Panasonic Holdings Corporation, Osaka (JP)

(72) Inventors: Takahiro Kamai, Kyoto (JP); Akiho Sakurai, Osaka (JP); Katsunori Daimo, Osaka (JP); Kazunori Kawami, Kyoto (JP); Shogo Takahata, Osaka (JP); Seiki Nagao, Tokyo (JP)

(73) Assignee: PANASONIC HOLDINGS CORPORATION, Osaka (JP)

(*) Notice: Subject to any disclaimer, the term of this patent is extended or adjusted under 35 U.S.C. 154(b) by 146 days.

(21) Appl. No.: 18/587,094

(22) Filed: Feb. 26, 2024

(65) Prior Publication Data

US 2024/0203448 A1 Jun. 20, 2024

Related U.S. Application Data

(63) Continuation of application No. PCT/JP2022/029503, filed on Aug. 1, 2022.

(30) Foreign Application Priority Data

Sep. 2, 2021 (JP) ................................ 2021-143569

(51) Int. Cl.
*G10L 25/66* (2013.01)

(52) U.S. Cl.
CPC .................................. *G10L 25/66* (2013.01)

(58) Field of Classification Search
CPC ...................................................... G10L 25/66
See application file for complete search history.

(56) References Cited

U.S. PATENT DOCUMENTS

| | | | |
|---|---|---|---|
| 2015/0005645 | A1 | 1/2015 | Thompson |
| 2020/0118584 | A1 | 4/2020 | Park et al. |

(Continued)

FOREIGN PATENT DOCUMENTS

| | | |
|---|---|---|
| CN | 107456208 | 12/2017 |
| CN | 112927696 | 6/2021 |

(Continued)

OTHER PUBLICATIONS

Godino-Llorente, J. I., et al. "Towards the identification of Idiopathic Parkinson's Disease from the speech. New articulatory kinetic biomarkers." PloS one 12.12 (2017): e0189583. (Year: 2017).*

(Continued)

*Primary Examiner* — Brian L Albertalli
(74) *Attorney, Agent, or Firm* — Wenderoth, Lind & Ponack, L.L.P.

(57) ABSTRACT

A dysarthria detection method includes an obtaining step and a detecting step. In the obtaining step, voice information regarding voice uttered by a subject is obtained. In the detecting step, it is detected whether the subject has dysarthria, based on an output result obtained by inputting the voice information obtained in the obtaining step into a detection model. The detection model has been trained by machine learning to output information regarding whether the subject has dysarthria by using voice information inputted.

14 Claims, 13 Drawing Sheets

(56) References Cited

U.S. PATENT DOCUMENTS

| | | | | |
|---|---|---|---|---|
| 2020/0312302 | A1 | 10/2020 | Lin et al. | |
| 2021/0193173 | A1* | 6/2021 | Berisha | G10L 25/66 |
| 2021/0202090 | A1 | 7/2021 | O'Donovan et al. | |
| 2023/0172526 | A1* | 6/2023 | Lipsmeier | G10L 15/22 |
| 2024/0282448 | A1* | 8/2024 | Singh | G16H 50/20 |

FOREIGN PATENT DOCUMENTS

| | | | | |
|---|---|---|---|---|
| JP | 2010-48931 | | 3/2010 | |
| JP | 2016-522730 | | 8/2016 | |
| JP | 2020-166224 | | 10/2020 | |
| WO | WO-2004008295 | A2 * | 1/2004 | G10L 17/26 |
| WO | WO-2006109268 | A1 * | 10/2006 | G10L 15/10 |
| WO | 2014/209303 | | 12/2014 | |
| WO | WO-2018113243 | A1 * | 6/2018 | G10L 15/04 |
| WO | WO-2023017983 | A1 * | 2/2023 | G16H 50/30 |

OTHER PUBLICATIONS

Carmichael, James Nathaniel. "Enhancing speech rate estimation techniques to improve dysarthria diagnosis." 2017 8th IEEE Annual Information Technology, Electronics and Mobile Communication Conference (IEMCON). IEEE, 2017. (Year: 2017).*

Rozenstoks, Kris, et al. "Automated assessment of oral diadochokinesis in multiple sclerosis using a neural network approach: Effect of different syllable repetition paradigms." IEEE Transactions on Neural Systems and Rehabilitation Engineering 28.1 (2019): 32-41. (Year: 2019).*

International Search Report (ISR) issued on Oct. 18, 2022 in International (PCT) Application No. PCT/JP2022/029503.

Kiyoji Kanai, "A Study on Speech Intelligibility in Patients With Paralytic Dysarthria Following Cerebral Apoplexy", Nippon Jibiinkoka Gakkai Kaiho, vol. 79 No. 4, pp. 478-490, [URL]https://doi.org/10.3950/jibiinkoka.79.478, 1976, with its partial English translation.

* cited by examiner

DYSARTHRIA DETECTION METHOD, DYSARTHRIA DETECTION DEVICE, AND RECORDING MEDIUM

CROSS REFERENCE TO RELATED APPLICATIONS

This is a continuation application of PCT International Application No. PCT/JP2022/029503 filed on Aug. 1, 2022, designating the United States of America, which is based on and claims priority of Japanese Patent Application No. 2021-143569 filed on Sep. 2, 2021. The entire disclosures of the above-identified applications, including the specifications, drawings and claims are incorporated herein by reference in their entirety.

FIELD

The present disclosure relates to a dysarthria detection method, a dysarthria detection device, and a recording medium for detecting dysarthria of a subject.

BACKGROUND

Patent Literature (PTL) 1 discloses a detection system for detecting a leading stroke risk indicator. In this detection system, a video camera captures a video of the face of a subject to be evaluated for having a stroke risk indicator. A processor then analyzes processed image data associated with the video of the subject's face captured by the video camera. The processor determines whether the captured image data exhibits a leading indicator for carotid artery stenosis.

CITATION LIST

Patent Literature

PTL 1: Japanese Unexamined Patent Application Publication (Translation of PCT Application) No. 2016-522730

SUMMARY

Technical Problem

The present disclosure provides a dysarthria detection method, a dysarthria detection device, and a recording medium that enable readily detecting whether a subject has dysarthria without imposing burdens on the subject.

Solution to Problem

In accordance with an aspect of the present disclosure, a dysarthria detection method includes: obtaining voice information regarding voice uttered by a subject, and detecting whether the subject has dysarthria based on an output result obtained by inputting the voice information obtained in the obtaining into a detection model that has been trained by machine learning to output information regarding whether the subject has dysarthria by using voice information inputted.

Advantageous Effects

According to the present disclosure, advantageously, whether a subject has dysarthria is readily detected without imposing burdens on the subject.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENT

Knowledge Leading to the Present Disclosure

Figure 1:
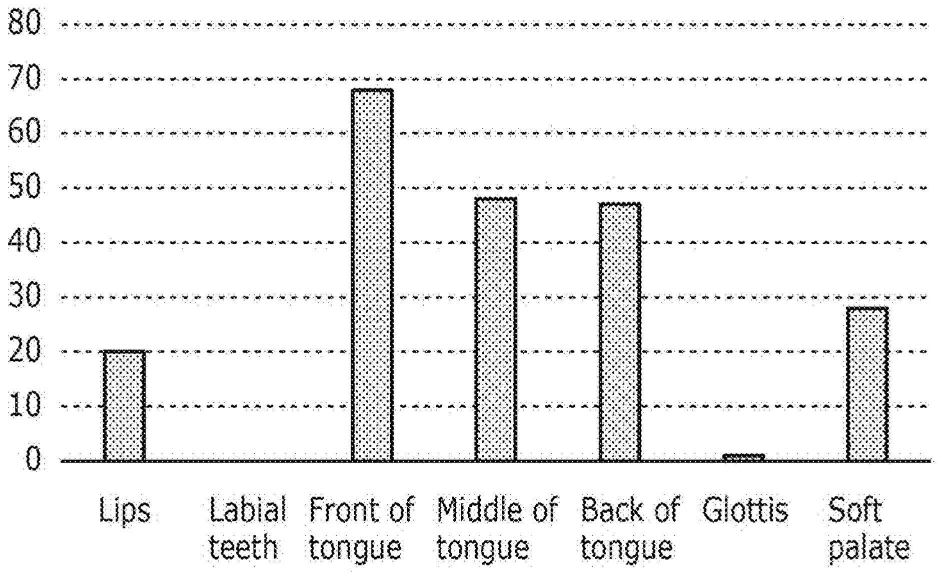
FIG. 1 is a diagram for describing characteristics of stroke patients.

Techniques for detecting the risk of the onset of stroke by analyzing a captured image of a subject's face have been known, for example the one disclosed in PTL 1. As mentioned above, in the detection system disclosed in PTL 1, a video camera captures a video of a subject's face. Processed image data associated with the video of the subject's face is then analyzed to determine whether the captured image data exhibits a leading indicator for carotid artery stenosis, which is a risk factor for stroke.

Unfortunately, the detection system disclosed in PTL 1 requires capturing a video of a subject's face with a video camera. This tends to increase burdens on subjects who are reluctant to be captured by a device such as a camera.

In addition, because the detection system disclosed in PTL 1 analyzes captured image data of the subject's face, it is important that the subject's face is positioned or angled appropriately in the image data. If the subject is to capture the subject's own face with a video camera, the subject has to make some effort to obtain appropriate image data, and this tends to increase burdens on the subject.

In view of the above inconveniences, the inventors of the present application have found by careful study that it is possible to detect, from voice uttered by a subject, whether the subject has dysarthria, or in other words, whether the subject uttering phrases can correctly pronounce phonemes in the phrases. As will be described below, whether a subject has dysarthria may indicate whether there is a sign of the onset of stroke in the subject. Thus, whether there is a sign of the onset of stroke in the subject can be detected simply from voice uttered by the subject.

The present disclosure can provide a dysarthria detection method, a dysarthria detection device, and a recording medium that enable, without imposing burdens on a subject, readily detecting whether the subject has dysarthria and further whether there is a sign of the onset of stroke in the subject, compared with a case where the subject's face needs to be captured.

Outline of the Present Disclosure

The following is the outline of an embodiment of the present disclosure.

In accordance with an aspect of the present disclosure, a dysarthria detection method includes: obtaining voice information regarding voice uttered by a subject, and detecting whether the subject has dysarthria based on an output result obtained by inputting the voice information obtained in the obtaining into a detection model that has been trained by machine learning to output information regarding whether the subject has dysarthria by using voice information inputted.

Thus, whether the subject has dysarthria can be detected simply from the voice uttered by the subject. This advantageously facilitates detecting whether the subject has dysarthria without imposing burdens on the subject, compared with a case where the subject is to capture the subject's own face with a video camera.

For example, in the dysarthria detection method in accordance with the aspect of the present disclosure, it is possible that the voice information includes a specific sound uttered by the subject moving a tongue of the subject in a predetermined pattern.

Thus, the degree of tongue paralysis, which can be an indicator of whether dysarthria has occurred, can readily be detected. This advantageously facilitates detecting whether the subject has dysarthria, compared with a case where the voice information does not include the specific sound.

For example, in the dysarthria detection method in accordance with the aspect of the present disclosure, it is possible that the specific sound is a tap sound.

Thus, the specific sound includes a tap sound, which is difficult to utter with a paralyzed tongue. This advantageously further facilitates detecting whether the subject has dysarthria.

For example, in the dysarthria detection method in accordance with the aspect of the present disclosure, it is possible that the voice information includes a phrase in which the specific sound and a plosive sound are consecutive.

Thus, a plosive sound, which is readily located in the voice uttered by the subject, is consecutive with the specific sound to facilitate locating the specific sound in the voice uttered by the subject. This advantageously further facilitates detecting whether the subject has dysarthria.

For example, in the dysarthria detection method in accordance with the aspect of the present disclosure, it is possible that the voice information includes a plurality of phrases each being the phrase. The dysarthria detection method may further include: segmenting the voice information obtained in the obtaining into the plurality of phrases. In the detecting, each of the plurality of phrases segmented in the segmenting may be inputted into the detection model.

This advantageously further facilitates detecting whether the subject has dysarthria, compared with a case where a single phrase is used to detect whether the subject has dysarthria.

For example, in the dysarthria detection method in accordance with the aspect of the present disclosure, it is possible that the segmenting of the plurality of phrases is performed based on a Root Mean Square (RMS) envelope or a spectrogram as the voice information.

Thus, an RMS envelope or a spectrogram tends to show distinctive characteristics that allow distinguishing between the phrases. This will advantageously improve the accuracy of segmenting voice information into the phrases.

For example, in the dysarthria detection method in accordance with the aspect of the present disclosure, it is possible that the segmenting of the plurality of phrases is performed by inputting the voice information obtained in the obtaining into a segmentation model that has been trained by machine learning to segment voice information inputted into the plurality of phrases.

This will advantageously improve the accuracy of segmenting voice information into the phrases, compared with a case where the voice information are segmented into the phrases without using the segmentation model. For a large amount of training data, the accuracy will be improved by using a deep neural network (DNN) model as the segmentation model. For a small amount of training data, the accuracy will be improved by the segmentation model that uses an RMS envelope as the voice information.

For example, in the dysarthria detection method in accordance with the aspect of the present disclosure, it is possible that the detection model is an autoencoder model that has been trained by machine learning to receive voice uttered by a person without dysarthria and restore voice identical to the voice received, It is possible that the detecting whether the subject has dysarthria is performed based on a degree of deviation between the voice information inputted into the detection model and the voice information outputted from the detection model.

Thus, a large amount of training data can readily be provided, compared with a case where the detection model is trained using voice of patients with dysarthria, who are fewer in number than people without dysarthria. This advantageously facilitates training the detection model.

For example, it is possible that the dysarthria detection method in accordance with the aspect of the present disclosure further includes outputting detection information regarding whether the subject has dysarthria which is detected in the detecting.

Thus, the information detected may be outputted for the subject, for example. This advantageously enables the subject to know whether the subject has dysarthria.

For example, it is possible that the dysarthria detection method in accordance with the aspect of the present disclosure further includes reproducing, for the subject, sample voice of voice to be uttered by the subject.

Thus, the subject can attempt to utter voice to imitate the sample voice. This advantageously facilitates obtaining the subject's voice, compared with a case where a text string is displayed to prompt the subject to utter voice. Also, whether the subject has dysarthria, including whether the subject can utter voice to imitate the sample voice, can be detected. This will advantageously improve the accuracy of detecting whether the subject has dysarthria.

In accordance with another aspect of the present disclosure, a non-transitory computer-readable recording medium has recorded thereon a computer program for causing a computer to execute the above-described dysarthria detection method.

Thus, whether the subject has dysarthria can be detected simply from the voice uttered by the subject. This advantageously facilitates detecting whether the subject has dysarthria without imposing burdens on the subject, compared with a case where the subject is to capture the subject's own face with a video camera.

In accordance with still another aspect of the present disclosure, a dysarthria detection device includes: an obtainer that obtains voice information regarding voice uttered by a subject, and a detector that detects whether the subject has dysarthria, based on an output result obtained by inputting the voice information obtained by the obtainer into a detection model that has been trained by machine learning to output information regarding whether the subject has dysarthria by using voice information inputted.

Thus, whether the subject has dysarthria can be detected simply from the voice uttered by the subject. This advantageously facilitates detecting whether the subject has dysarthria without imposing burdens on the subject, compared with a case where the subject is to capture the subject's own face with a video camera.

General or specific aspects of the present disclosure may be implemented to a system, a device, a method, an integrated circuit, a computer program, a computer-readable recording medium such as a Compact Disc-Read Only Memory (CD-ROM), or any given combination thereof.

Hereinafter, certain exemplary embodiments will be described in detail with reference to the accompanying Drawings. The following embodiments are specific examples of the present disclosure. The numerical values, shapes, materials, elements, arrangement and connection configuration of the elements, steps, the order of the steps, etc., described in the following embodiments are merely examples, and are not intended to limit the present disclosure. Among elements in the following embodiments, those not described in any one of the independent claims indicating the broadest concept of the present disclosure are described as optional elements. Note that the respective figures are schematic diagrams and are not necessarily precise illustrations.

Embodiment

An embodiment will be described in detail below with reference to the drawings.

1. Overview

Before describing a dysarthria detection device and a dysarthria detection method according to the embodiment, description will be provided for an overview of findings that voice uttered by a subject exhibits characteristics that allow detecting whether the subject has dysarthria. FIG. 1 is a diagram for describing characteristics of stroke patients. Stroke as used herein may include, for example, cerebral infarction such as lacunar cerebral infarction and atherothrombotic cerebral infarction, and intracerebral hemorrhage. FIG. 1 shows the result of estimating abnormal sites by speech-language-hearing therapists listening to a total of one hundred and several tens of voices uttered by a total of several tens of stroke patients. In FIG. 1, the abscissa indicates sites diagnosed as having paralysis in the oral cavity, and the ordinate indicates the number of subjects. As illustrated in FIG. 1, stroke patients often have paralysis in their oral cavities. In particular, it can be seen that stroke patients noticeably have tongue paralysis, such as in the front, middle, or back of their tongues.

Here, to locate paralysis in the subjects' oral cavities, the subjects were caused to utter a test phrase, and the speech-language-hearing therapists listened to the subjects' voice. The test phrase used is a phrase that is difficult to utter by subjects having paralysis in their oral cavities, for example "ruri mo hari mo teraseba hikaru."

Figure 2:
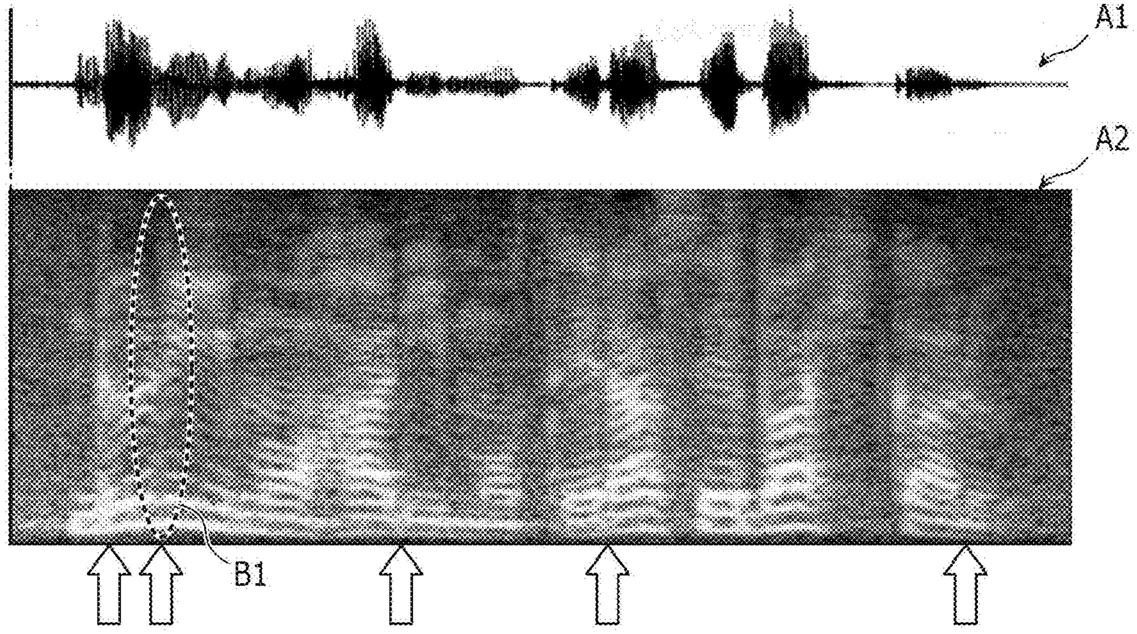
FIG. 2 is a diagram illustrating an example of a voice waveform of a person without dysarthria and a mel-spectrogram obtained from the voice waveform.
Figure 3:
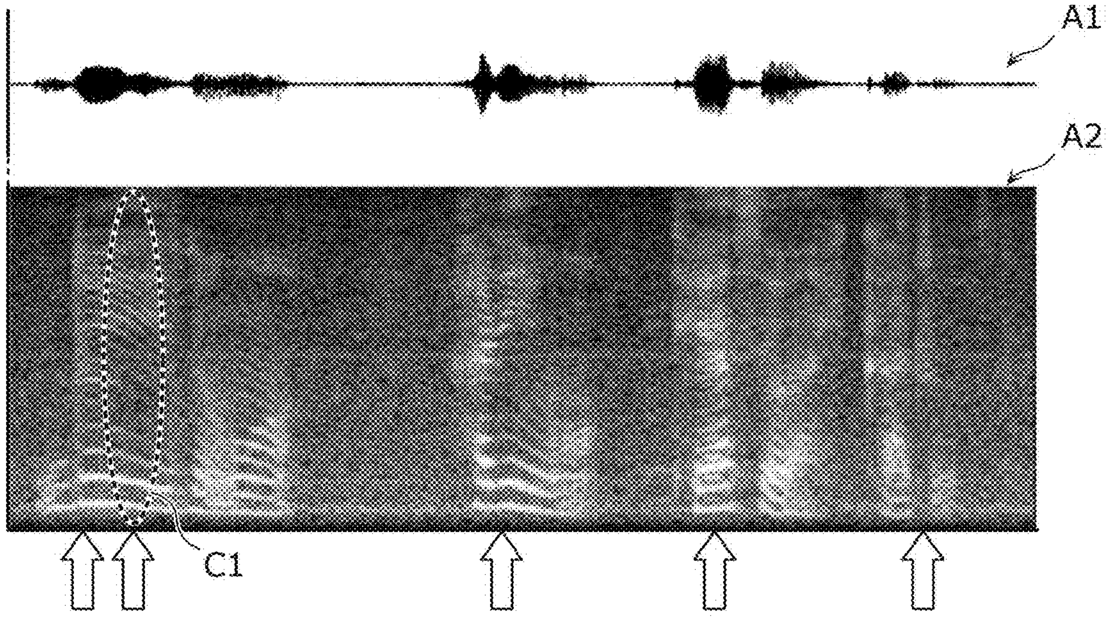
FIG. 3 is a diagram illustrating an example of a voice waveform of a stroke patient and a mel-spectrogram obtained from the voice waveform.

FIG. 2 is a diagram illustrating an example of a voice waveform of a person without dysarthria and a spectrogram obtained from the voice waveform. FIG. 3 is a diagram illustrating an example of a voice waveform of a stroke patient and a spectrogram obtained from the voice waveform.

In each of FIGS. 2 and 3, upper region A1 shows the waveform, and lower region A2 shows the spectrogram. A spectrogram as used herein is a representation of the spectrum of frequencies of a subject's voice over time. The voice waveforms illustrated in FIGS. 2 and 3 are each a waveform obtained by causing the subject to utter the test phrase "ruri mo hari mo teraseba hikaru" and picking up the subject's voice.

The test phrase "ruri mo hari mo teraseba hikaru" includes consonantal sounds in the "r" column in Japanese, and these consonantal sounds are tap sounds. A tap sound as used herein is a consonantal sound produced by a momentary contact of articulators in the oral cavity, for example a sound produced by the tongue touching the hard palate for a very short period of time. That is, a tap sound is a specific sound uttered by a subject moving the tongue in a predetermined pattern. Such a specific sound is difficult to pronounce correctly with a paralyzed tongue.

In FIGS. 2 and 3, hollow arrows indicate locations at which consonantal sounds in the "r" column, i.e., tap sounds, were pronounced in the test phrase. As illustrated in FIG. 2, the mel-spectrogram obtained from the voice waveform of the person without dysarthria has a vertically extending dark linear region B1 at each location where a tap sound was pronounced. Thus, if a tap sound is correctly pronounced, a power decrease occurs for a very short period of time (e.g., not longer than 20 ms).

By contrast, as illustrated in FIG. 3, the spectrogram obtained from the voice waveform of the stroke patient may have no power decrease for a very short period of time at each location where a tap sound was pronounced, that is, may have no such a region as the vertically extending dark linear region B1 (see region C1). Thus, the tap sounds may have failed to be correctly pronounced at locations where the tap sounds should be pronounced, and this may be because the stroke patient's tongue did not touch the hard palate due to tongue paralysis. It is to be noted that the stroke patient may also have failed to correctly pronounce a tap sound where the spectrogram shows a relatively small amount of power decrease or a power decrease for a relatively long period of time.

As above, voice uttered by a subject exhibits characteristics that allow detecting whether the subject has tongue paralysis, or in other words, whether the subject has dysarthria. Therefore, analyzing the characteristics of the voice uttered by the subject, for example analyzing whether tap sounds are pronounced correctly, enables detecting whether the subject has dysarthria, and further whether there is a sign of the onset of stroke in the subject.

2. Configuration

Figure 4:
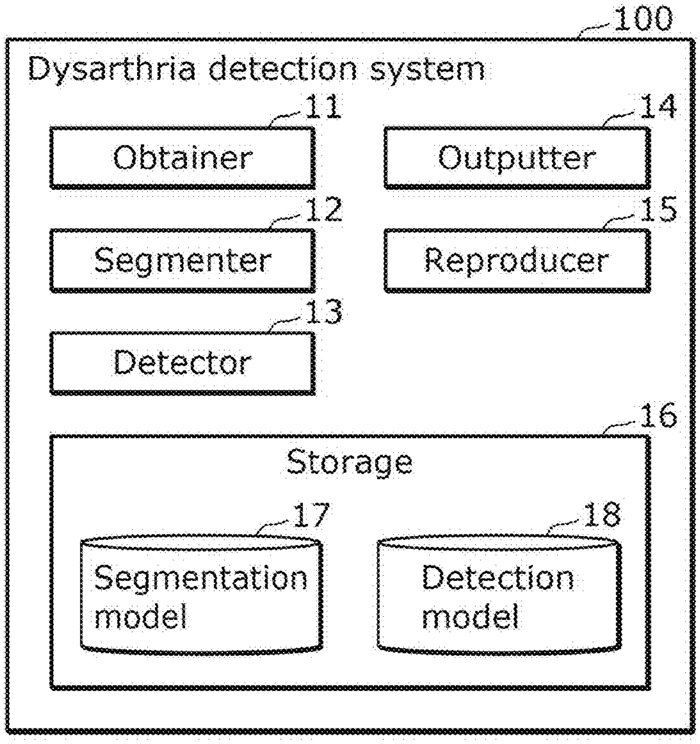
FIG. 4 is a block diagram illustrating an example of the configuration of a dysarthria detection device according to an embodiment.

Now, the configuration of the dysarthria detection device and the dysarthria detection method according to the embodiment will be described in detail. FIG. 4 is a block diagram illustrating an example of the configuration of dysarthria detection device 100 according to the embodiment. In the embodiment, dysarthria detection device 100 is provided in an information terminal, such as a smartphone or a tablet terminal. Dysarthria detection device 100 may also be provided in a desktop or laptop personal computer. Dysarthria detection device 100 is also referred to as "dysarthria detection system 100."

As illustrated in FIG. 4, dysarthria detection device 100 includes obtainer 11, segmenter 12, detector 13, outputter 14, reproducer 15, and storage 16. Storage 16 has stored therein segmentation model 17 and detection model 18. In the embodiment, obtainer 11, segmenter 12, detector 13, outputter 14, and reproducer 15 are all implemented by a processor in the information terminal or the personal computer executing a predetermined program.

Obtainer 11 obtains voice information regarding voice uttered by a subject. Obtainer 11 is the agent of an obtaining step in the dysarthria detection method. For example, obtainer 11 obtains the voice information by picking up, through a microphone provided on the information terminal, voice uttered by the subject and converting the voice picked up to an electric signal. The voice information here may include a voice waveform of the voice uttered by the subject, or information resulting from appropriate information processing on the voice waveform. As an example, the voice information may include a Root Mean Square (RMS) envelope obtained from the voice waveform, or a spectrogram (including a mel-spectrogram) of the voice waveform.

In the embodiment, obtainer 11 obtains the voice information including multiple phrases by prompting the subject to utter a test phrase including the phrases. A phrase as used herein is, for example, a phrase in which a specific sound, such as a tap sound, uttered by a subject moving the tongue in a predetermined pattern, and a plosive sound are consecutive. In the embodiment, the phrase is "dere." That is, in the embodiment, the subject is prompted to utter the test phrase "dere dere dere . . . " in which the above phrase is repeated multiple times.

Thus, in the embodiment, the voice information includes a specific sound uttered by the subject moving the tongue in a predetermined pattern. In the embodiment, the specific sound is a tap sound. Also, in the embodiment, the voice information includes a phrase in which the specific sound and a plosive sound are consecutive. Further, in the embodiment, the voice information includes multiple phrases, each being the above phrase.

The reason for adopting "dere dere dere . . . " as the test phrase will be described. As described above, the test phrase including the specific sound, for example a tap sound, enables detecting whether a subject has dysarthria from voice uttered by the subject. However, to analyze whether the subject correctly pronounced the specific sound, it is preferred to locate where the specific sound should be pronounced in the voice uttered by the subject. Without knowledge of where the specific sound should be pronounced in the test phrase, it cannot be determined whether a subject with dysarthria, for example a stroke patient, failed to correctly pronounce the specific sound or had no intention at all to pronounce the specific sound, while uttering the test phrase.

For the above reason, the inventors of the present application have found out adopting, as the test phrase, a phrase such that a plosive sound, which is relatively easy to locate in voice uttered by a subject, and the specific sound are consecutive. A plosive sound is a sound (a consonantal sound) produced by blocking expired air with the lips closed, the tip of the tongue and the upper teethridge closed, or the back of the tongue and the soft palate closed, and suddenly releasing the blocking. A plosive sound is relatively easy to locate in voice uttered by a subject because of its easy pronunciation with a paralyzed tongue compared with a tap sound, and a temporary power decrease upon pronunciation.

Once the plosive sound is located in the voice uttered by the subject, the specific sound consecutive with the plosive sound can also be located. The embodiment adopts "dere" as the phrase in which a plosive sound and the specific sound are consecutive.

Rather than a single phrase "dere," multiple phrases "dere dere dere . . . " are adopted as the test phrase to further improve the accuracy of detecting whether the subject has dysarthria. If a subject with dysarthria, for example a stroke patient, utters only the single phrase "dere," the subject may correctly pronounce the specific sound by chance. By contrast, if a subject with dysarthria utters the multiple phrases "dere dere dere . . . ," the probability that the subject fails to correctly pronounce the specific sound in at least one phrase increases. Repeating the phrase will thus facilitate detecting whether the subject has dysarthria. In addition, repeating the phrase requires more complicated tongue movements, which tends to reveal dysarthria more clearly.

Figure 5:
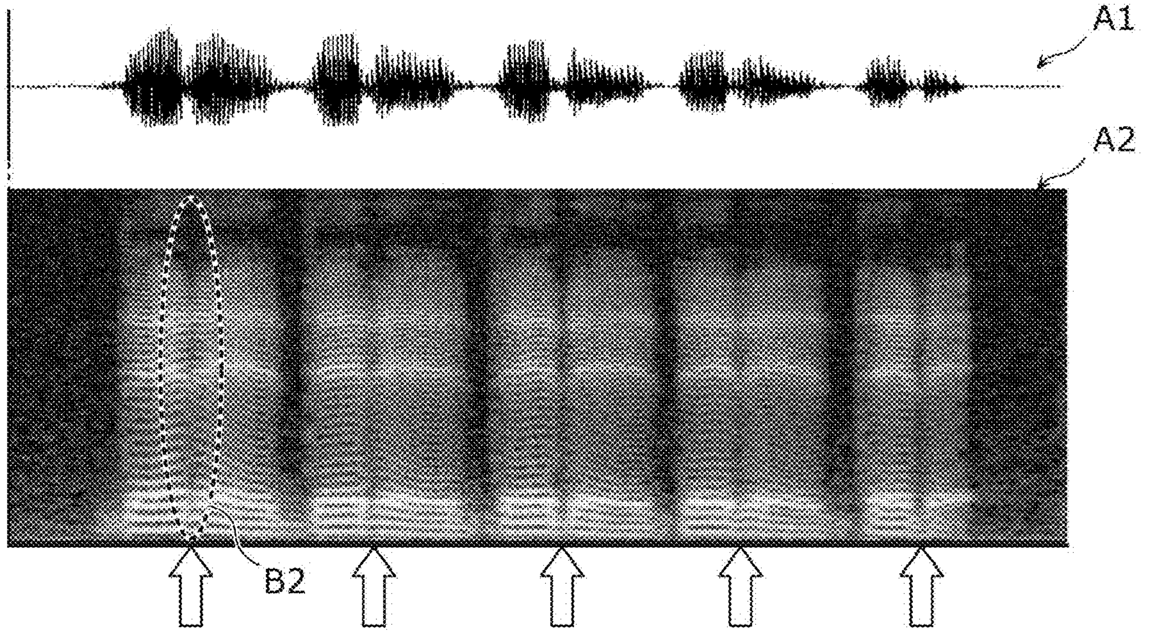
FIG. 5 is a diagram illustrating an example of a voice waveform of a person without dysarthria uttering multiple phrases and a mel-spectrogram obtained from the voice waveform.
Figure 6:
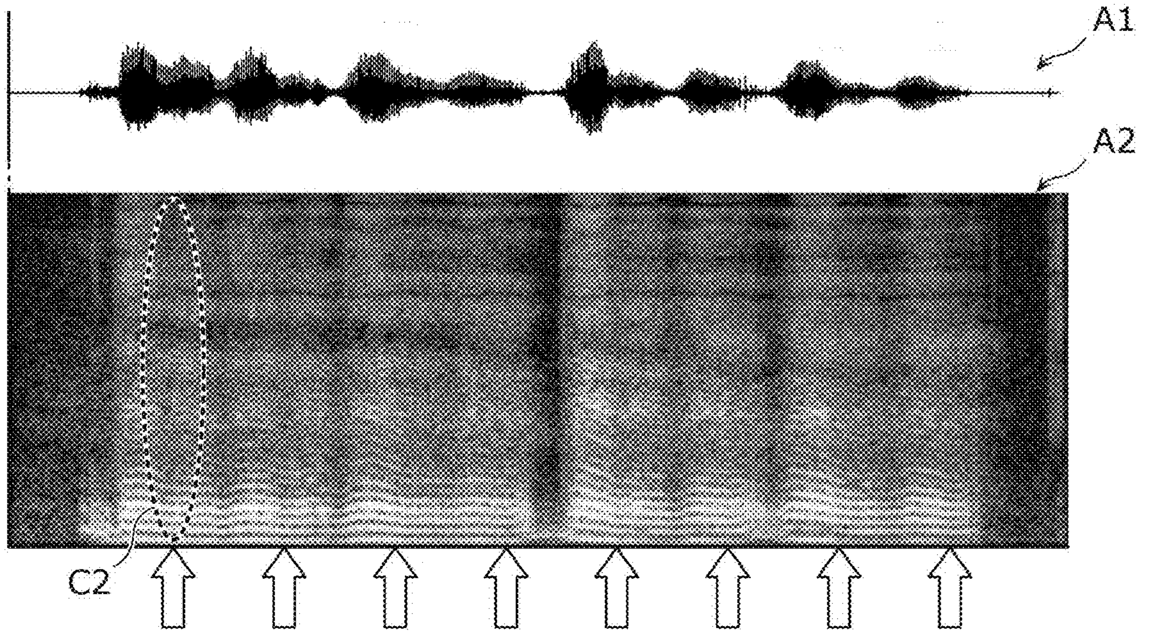
FIG. 6 is a diagram illustrating an example of a voice waveform of a stroke patient uttering the multiple phrases and a mel-spectrogram obtained from the voice waveform.
Figure 7:
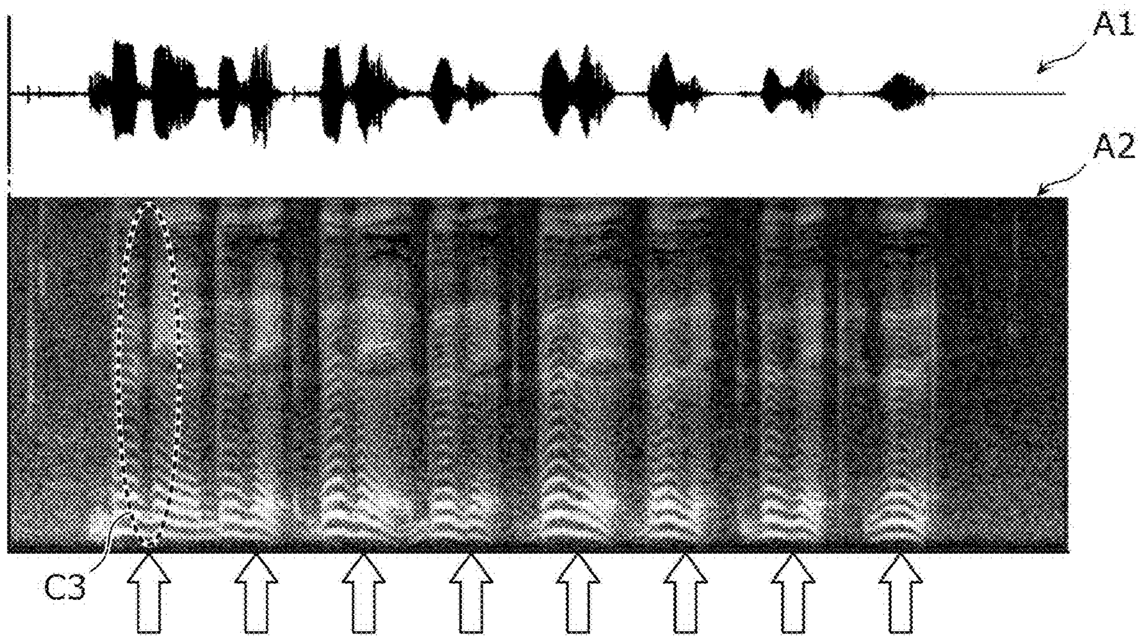
FIG. 7 is a diagram illustrating another example of a voice waveform of a stroke patient uttering the multiple phrases and a mel-spectrogram obtained from the voice waveform.

FIG. 5 is a diagram illustrating an example of a voice waveform of a person without dysarthria uttering multiple phrases and a spectrogram obtained from the voice waveform. FIG. 6 is a diagram illustrating an example of a voice waveform of a stroke patient uttering the multiple phrases and a spectrogram obtained from the voice waveform. FIG. 7 is a diagram illustrating another example of a voice waveform of a stroke patient uttering the multiple phrases and a spectrogram obtained from the voice waveform.

In each of FIGS. 5 to 7, upper region A1 shows the waveform, and lower region A2 shows the spectrogram. The voice waveforms illustrated in FIGS. 5 to 7 are each a waveform obtained by causing the subject to utter the test phrase "dere dere dere . . . " and picking up the subject's voice.

In each of FIGS. 5 to 7, hollow arrows indicate locations at which "re," i.e., a tap sound, was pronounced in the test phrase. As illustrated in FIG. 5, because the tap sound was correctly pronounced at the locations where the tap sound should be pronounced, the spectrogram obtained from the voice waveform of the person without dysarthria has a vertically extending dark linear region B2 at each location where the tap sound was pronounced, indicating a power decrease for a very short period of time. By contrast, as illustrated in FIG. 6, the spectrogram obtained from the voice waveform of the stroke patient has no vertically extending dark linear region indicating a power decrease for a very short period of time, at each location where the tap sound should be pronounced, for example as shown in region C2. This means that the tap sound was not correctly pronounced. The spectrogram obtained from the voice waveform of the other stroke patient illustrated in FIG. 7 has a power decrease for a relatively long period of time at each location where the tap sound should be pronounced, for example as shown in region C3. Again, this means that the tap sound was not correctly pronounced.

Figure 8:
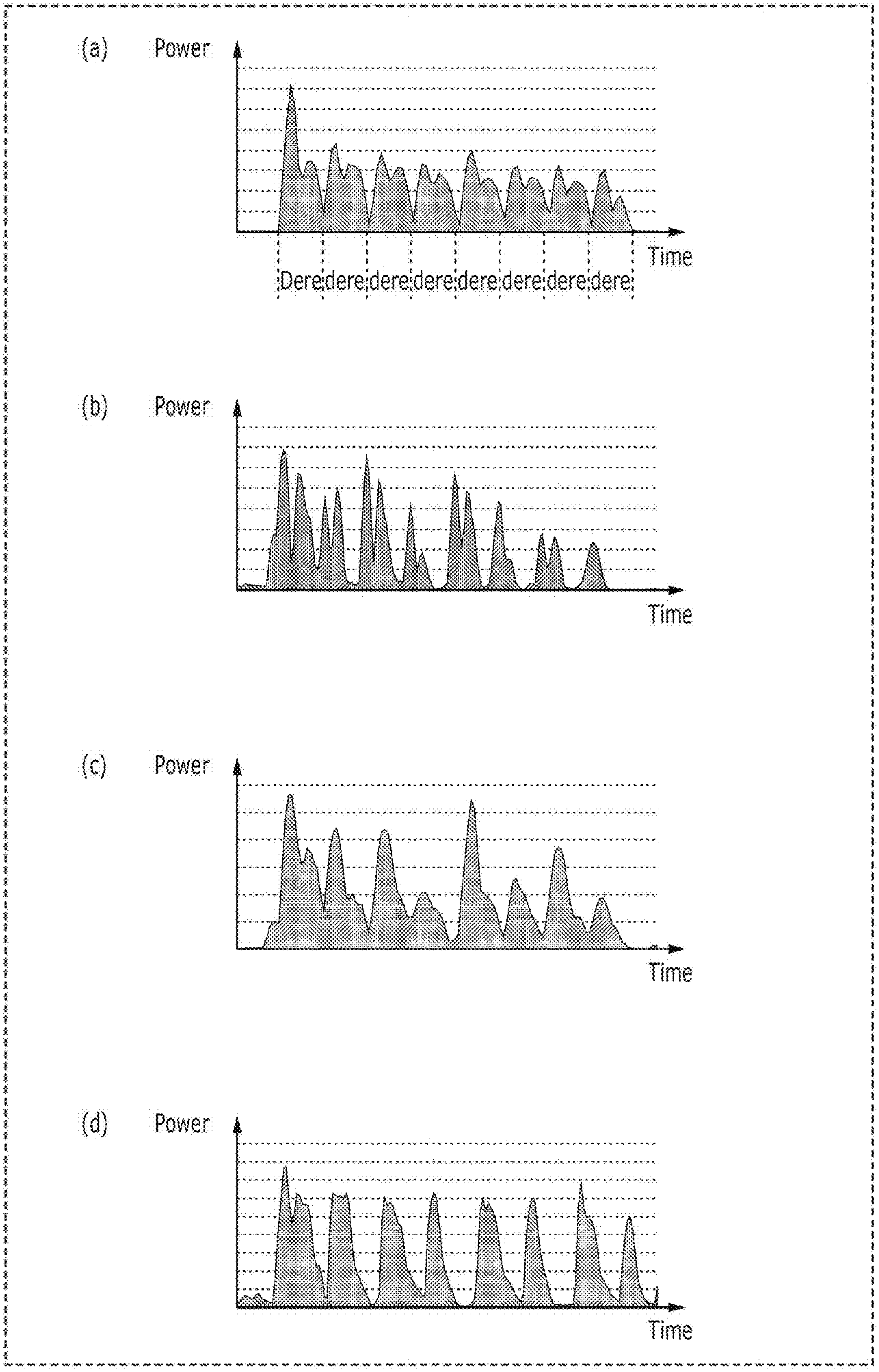
FIG. 8 is a diagram illustrating an example of RMS envelopes obtained from voice waveforms of a person without dysarthria and stroke patients uttering multiple phrases.

Characteristics that allow detecting whether dysarthria has occurred may appear not only in spectrograms obtained from voice waveforms but also RMS envelopes obtained from voice waveforms. FIG. 8 is a diagram illustrating an example of RMS envelopes obtained from voice waveforms of a person without dysarthria and stroke patients uttering multiple phrases. (a) in FIG. 8 illustrates an RMS envelope obtained from a voice waveform of a person without dysarthria. (b), (c), and (d) in FIG. 8 each illustrate an RMS envelope obtained from a voice waveform of a stroke patient. The RMS envelopes of (a), (b), (c), and (d) in FIG. 8 each resulted from appropriate information processing on a voice waveform obtained by causing the subject to utter the test phrase "dere dere dere . . . " and picking up the voice.

As illustrated in (a) in FIG. 8, in the RMS envelope obtained from the voice waveform of the person without dysarthria, the envelope sections for the respective phrases are regularly shaped, and a slight power decrease due to correct pronunciation of the tap sound is seen at the center of each phrase. By contrast, in the RMS envelope obtained from the stroke patient's voice waveform illustrated in (b) in FIG. 8, the envelope sections for the respective phrases are irregularly shaped, and a sharp power decrease due to incorrect pronunciation of the tap sound is seen at the center of each phrase. Similarly, in the RMS envelope obtained from another stroke patient's voice waveform illustrated in (c) in FIG. 8, the envelope sections for the respective phrases are irregularly shaped. Similarly, in the RMS envelope obtained from even another stroke patient's voice waveform illustrated in (d) in FIG. 8, the envelope sections for the respective phrases are irregularly shaped, and the phrases are also irregularly spaced.

As above, by adopting "dere dere dere . . . " as the test phrase, both a spectrogram and an RMS envelope obtained from a voice waveform tend to show distinctive characteristics indicating whether the tap sound was correctly pronounced.

Segmenter 12 segments the voice information obtained by obtainer 11 (the obtaining step) into the phrases. Segmenter 12 is the agent of a segmenting step in the dysarthria detection method. Specifically, because the test phrase is uttered by the subject repeating the phrase "dere" as "dere dere dere . . . " as described above, the test phrase includes multiple phrases. Segmenter 12 segments a set of the multiple phrases "dere dere dere . . . " into individual phrases "dere" to facilitate working with the voice information in detector 13 to be described later.

In the embodiment, segmenter 12 (the segmenting step) segments an RMS envelope or a spectrogram (here, a mel-spectrogram) serving as the voice information into the phrases. In the embodiment, segmenter 12 (the segmenting step) segments the voice information into the phrases by inputting the voice information obtained by obtainer 11 (the obtaining step) into segmentation model 17. Segmentation model 17 is a trained model trained by machine learning to segment the inputted voice information into the phrases.

Specifically, for example, segmentation model 17 is a deep neural network (DNN) model and is a sequence labeling model. Segmentation model 17 receives input of an RMS envelope or a spectrogram obtained from the voice waveform including the multiple phrases, and outputs a label data. The label data is a set of binary information indicating whether each frame belongs to a phrase. For example, if an RMS envelope or a spectrogram for 100 frames is obtained from the voice waveform, the label data is a set of binary information for 100 frames.

Segmenter 12 generates segmentation information based on the label data outputted from segmentation model 17, and outputs the segmentation information. For example, for the label data "11 . . . 100111 . . . ," the data portions of consecutive "1" represent phrases, and "0" represents a separation between the adjacent phrases. Thus, based on the label data, segmenter 12 generates the segmentation information including the start position and end position of each of the phrases.

Figure 9:
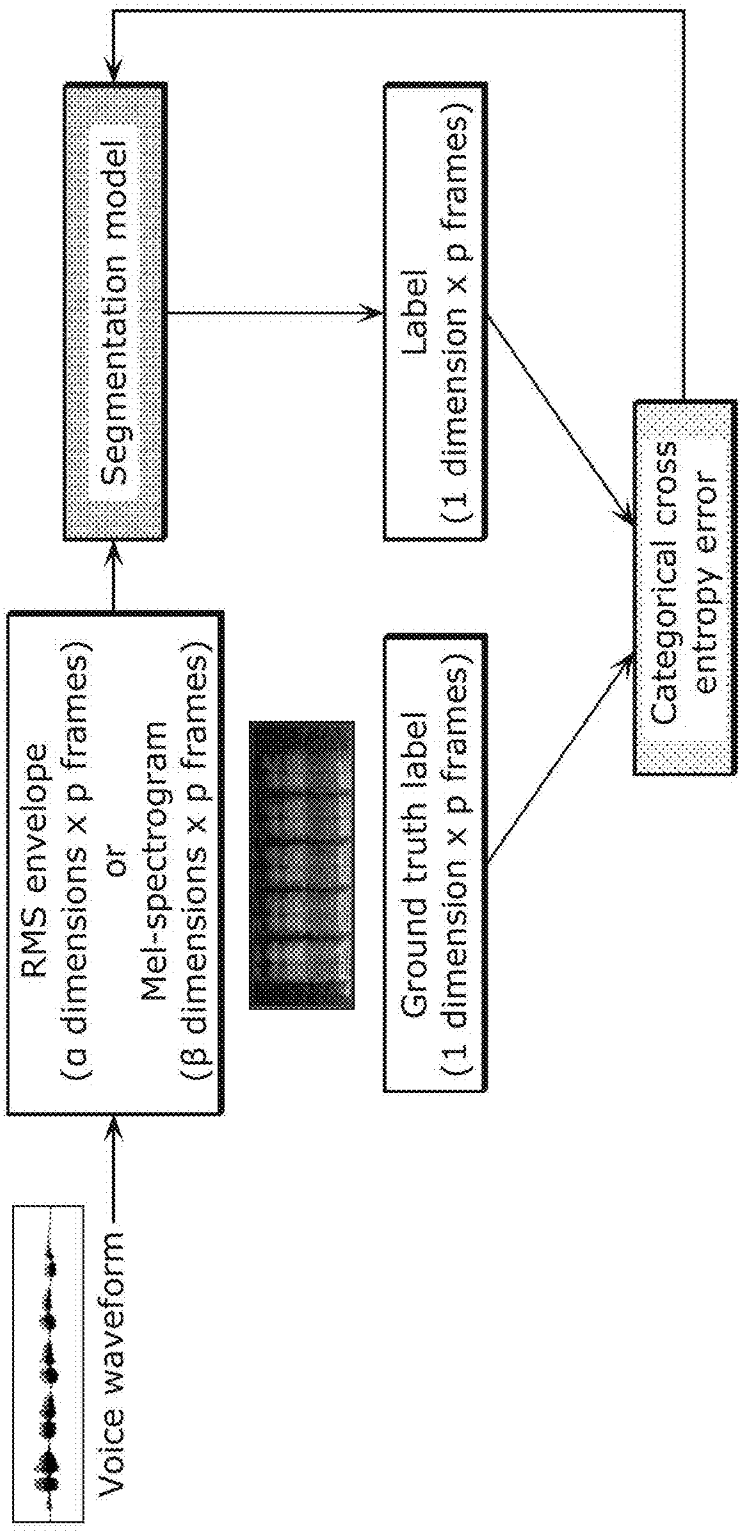
FIG. 9 is a diagram illustrating an example of a training phase of a segmentation model of the dysarthria detection device according to the embodiment.

A specific example of a training phase of segmentation model 17 will be described below with reference to FIG. 9. FIG. 9 is a diagram illustrating an example of the training phase of segmentation model 17 of dysarthria detection device 100 according to the embodiment. First, obtainer 11 performs appropriate information processing on a voice waveform picked up, thereby obtaining, as voice information, an RMS envelope or a mel-spectrogram from the voice waveform. The example in FIG. 9 shows an example of a mel-spectrogram.

The RMS envelope obtained from the voice waveform has the number of dimensions "$\alpha$" ($\alpha$=1) and the number of frames "p" (p is a natural number). The mel-spectrogram obtained from the voice waveform has the number of dimensions "$\beta$" ($\beta$ is a natural number and $\beta$>1), and the number of frames "p." The number of dimensions as used herein indicates the resolution of power along the frequency axis. The number of frames as used herein indicates the number of frames resulting from dividing the voice waveform on a unit time basis.

The voice information obtained by obtainer 11 is inputted into segmentation model 17 for which training by machine learning has not yet been completed (hereafter referred to as "uncompleted segmentation model 17"). Uncompleted segmentation model 17 accordingly outputs label data. This label data has the number of dimensions "1" and the number of frames "p."

The label data outputted by uncompleted segmentation model 17 and ground truth data are inputted into a loss function (here, the categorical cross entropy error function) to perform backpropagation so that the loss function outputs the minimum value. Uncompleted segmentation model 17 is thus trained by machine learning based on supervised learning. The ground truth data is label data generated in advance from a voice waveform obtained by causing a person without dysarthria to utter the test phrase. As with the label data outputted by uncompleted segmentation model 17, the ground truth data has the number of dimensions "1" and the number of frames "p."

Figure 10:
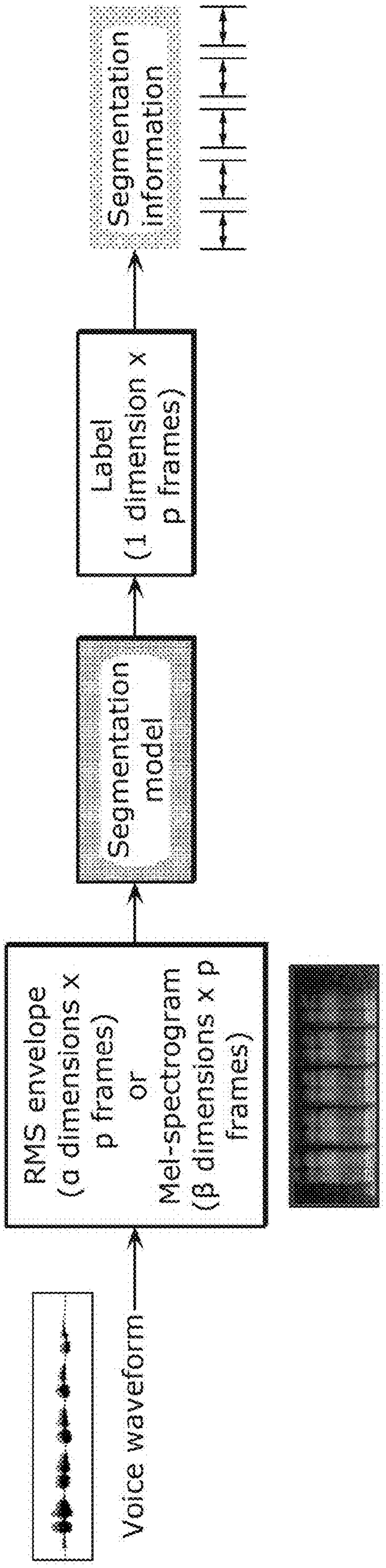
FIG. 10 is a diagram illustrating an example of an inference phase involving the segmentation model of the dysarthria detection device according to the embodiment.

A specific example of an inference phase involving segmentation model 17 for which the training by machine learning has been completed will be described below with reference to FIG. 10. FIG. 10 is a diagram illustrating an example of the inference phase involving segmentation model 17 of dysarthria detection device 100 according to the embodiment. First, obtainer 11 performs appropriate information processing on a voice waveform picked up, thereby obtaining, as voice information, an RMS envelope or a mel-spectrogram from the voice waveform. The example illustrated in FIG. 10 shows an example of a mel-spectrogram. The RMS envelope and the mel-spectrogram have the same number of frames as in the training phase. The RMS envelope and the mel-spectrogram also have the same number of dimensions as in the training phase.

Segmenter 12 inputs the voice information obtained by obtainer 11 into segmentation model 17. Segmentation model 17 accordingly outputs label data. Based on the label data outputted by segmentation model 17, segmenter 12 generates segmentation information that includes the start position and end position of each phrase. The segmentation information generated by segmenter 12 is used by detector 13 to be described below.

Detector 13 detects whether the subject has dysarthria based on an output result obtained by inputting the voice information obtained by obtainer 11 (the obtaining step) into detection model 18. Detector 13 is the agent of a detecting step in the dysarthria detection method. In the embodiment, detector 13 (the detecting step) inputs each of the phrases segmented by segmenter 12 (the segmenting step) into detection model 18. That is, in the embodiment, the voice information obtained by obtainer 11 (the obtaining step) is inputted into detection model 18 not directly but indirectly as the segmented phrases.

Detection model 18 is a model trained by machine learning to output information regarding whether the subject has dysarthria by using the voice information inputted. Specifically, for example, detection model 18 is a convolutional neural network (CNN) model, and is an autoencoder model trained by machine learning to receive voice information regarding voice uttered by a person without dysarthria and restore voice information identical to the voice information received. For example, detection model 18 receives input of the RMS envelope or the mel-spectrogram of the individual phrases segmented by segmenter 12, attempts to restore the phrases, and outputs an RMS envelope or a mel-spectrogram corresponding to the individual phrases.

Detector 13 (the detecting step) detects whether the subject has dysarthria based on the degree of deviation between the voice information inputted into detection model 18 and the voice information outputted from detection model 18. For example, if voice information regarding a person without dysarthria is inputted into detection model 18, detection model 18 restores and outputs voice information substantially identical to the voice information inputted. In this case, the degree of deviation is relatively low. By contrast, if voice information regarding a subject with dysarthria such as a stroke patient is inputted into detection model 18, detection model 18 cannot restore the voice information but outputs voice information different from the voice information inputted. In this case, the degree of deviation is relatively high.

Detector 13 thus generates detection information regarding whether the subject has dysarthria based on the degree of deviation between the input data inputted into detection model 18 and the output data outputted from detection model 18. For example, detector 13 calculates the mean square error between the input data inputted into detection model 18 and the output data outputted from detection model 18. If the mean square error calculated exceeds a threshold, detector 13 detects that the subject has dysarthria. Otherwise, detector 13 detects that the subject does not have dysarthria.

Figure 11:
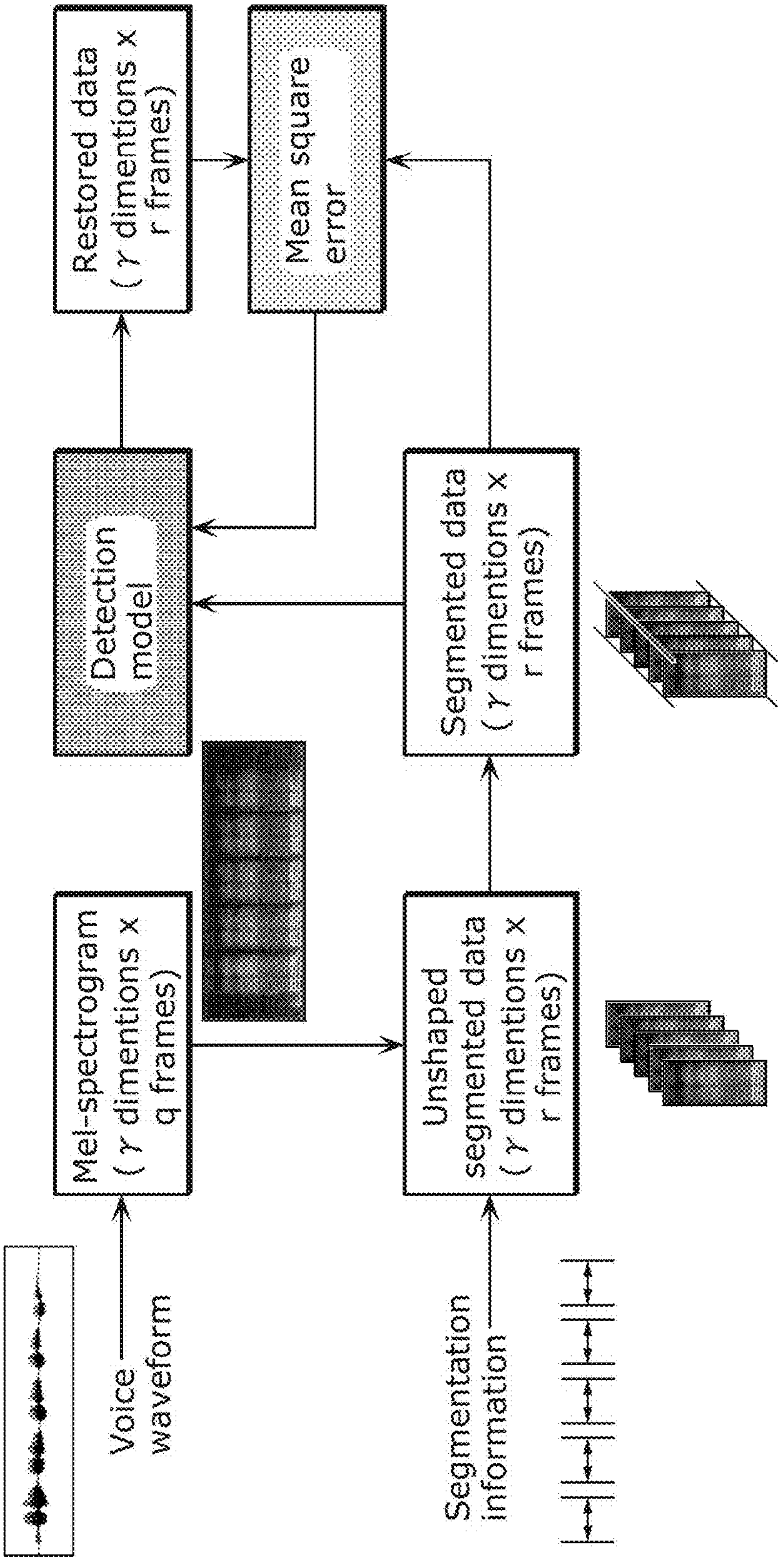
FIG. 11 is a diagram illustrating an example of a training phase of a detection model of the dysarthria detection device according to the embodiment.

A specific example of a training phase of detection model 18 will be described below with reference to FIG. 11. FIG. 11 is a diagram illustrating an example of the training phase of detection model 18 of dysarthria detection device 100 according to the embodiment. First, obtainer 11 performs appropriate information processing on a voice waveform picked up, thereby obtaining, as voice information, a mel-spectrogram from the voice waveform.

The mel-spectrogram obtained from the voice waveform has the number of dimensions "γ" (γ is a natural number and $\beta \neq \gamma$) and the number of frames "q" (q is a natural number and $q \neq p$).

Detector 13 refers to segmentation information outputted by segmenter 12 to segment the voice information obtained by obtainer 11 into phrases, thereby generating segmented data formed of only the phrases. The segmented data has the number of dimensions "γ" and the number of frames "r" (r is a natural number and $r<q$). The segmented data generated here includes phrases of nonuniform lengths and therefore will hereafter be referred to as "unshaped segmented data." The phrases in the segmented data are then resized to phrases of a uniform length. The resized segmented data will hereafter be referred to simply as "segmented data." As with the unshaped segmented data, the segmented data has the number of dimensions "γ" and the number of frames "r".

The segmented data is inputted into detection model 18 for which training by machine learning has not yet been completed (hereafter referred to as "uncompleted detection model 18"). Uncompleted detection model 18 accordingly outputs restored data resulting from attempting to restore the inputted segmented data. As with the segmented data, the restored data has the number of dimensions "γ" and the number of frames "r".

The segmented data, and the restored data outputted by uncompleted detection model 18, are inputted into a loss function (here, the mean square error function) to perform backpropagation so that the loss function outputs the minimum value. Uncompleted detection model 18 is thus trained by machine learning based on unsupervised learning.

Figure 12:
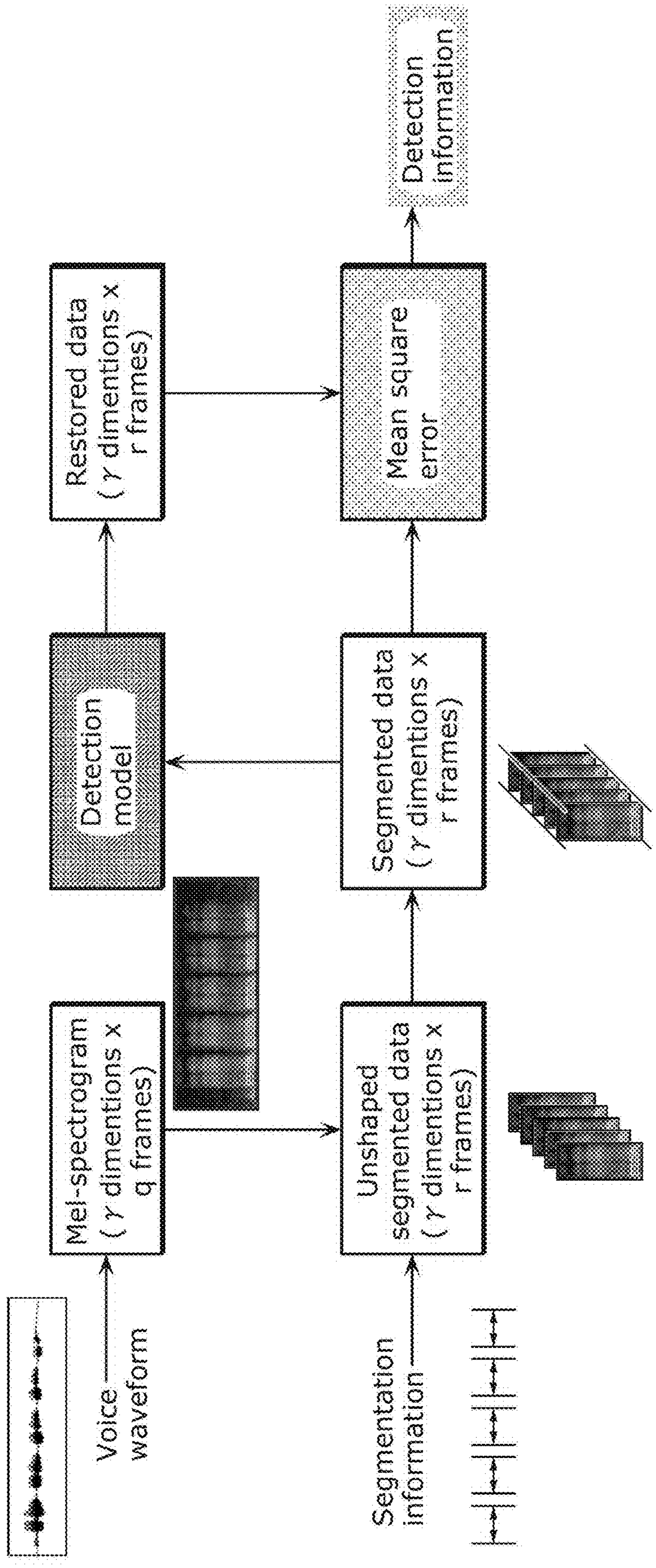
FIG. 12 is a diagram illustrating an example of an inference phase involving the detection model of the dysarthria detection device according to the embodiment.

A specific example of an inference phase involving detection model 18 for which the training by machine learning has been completed will be described below with reference to FIG. 12. FIG. 12 is a diagram illustrating an example of the inference phase involving detection model 18 of dysarthria detection device 100 according to the embodiment. First, obtainer 11 performs appropriate information processing on a voice waveform picked up, thereby obtaining, as voice information, a mel-spectrogram from the voice waveform. The example illustrated in FIG. 12 shows an example of a mel-spectrogram. The mel-spectrogram has the same number of dimensions and the same number of frames as in the training phase.

Detector 13 refers to segmentation information outputted by segmenter 12 to segment the voice information obtained by obtainer 11 into phrases, thereby generating unshaped segmented data. Detector 13 resizes the phrases in the unshaped segmented data to generate segmented data.

Detector 13 inputs the segmented data generated into detection model 18. Detection model 18 accordingly outputs restored data. Detector 13 calculates the mean square error between the segmented data inputted into detection model 18 and the restored data outputted by detection model 18. Detector 13 compares the mean square error calculated and a threshold, thereby generating detection information regarding whether the subject has dysarthria. The detection information generated by detector 13 is used by outputter 14 to be described later.

In the embodiment, both the training phase of detection model 18 and the inference phase involving detection model 18 use, as the voice information, mel-spectrograms obtained from voice waveforms. Alternatively, RMS envelopes obtained from voice waveforms may be used as the voice information.

Rather than inputting all the segmented data into detection model 18, detector 13 may input only part of the segmented data into detection model 18, for example by eliminating the last one of the phrases in the segmented data. This may be done because the subject might not completely utter the test phrase to the end, in which case the last phrase becomes noise for detection model 18.

Outputter 14 outputs detection information regarding whether the subject has dysarthria, detected by detector 13 (the detecting step). Outputter 14 is the agent of an outputting step in the dysarthria detection method. The detection information may include information indicating whether the subject has dysarthria. In the embodiment, the detection information includes information indicating whether there is a sign of the onset of stroke in the subject, which is associated with whether the subject has dysarthria. For example, outputter 14 outputs the detection information by displaying, on a display of the information terminal, a text string or an image representing the detection information.

Reproducer 15 reproduces, for the subject, sample voice for the voice to be uttered by the subject, before obtainer 11 obtains the voice information (before the obtaining step). Reproducer 15 is the agent of a reproducing step in the dysarthria detection method. For example, the sample voice is automated voice produced by reading the test phrase with a predetermined volume and a predetermined rhythm. Reproducer 15, for example triggered by the subject performing a predetermined operation on the information terminal, reproduces the sample voice from a speaker provided on the information terminal.

Storage 16 is a storage device that stores information (such as computer programs) necessary for various sorts of processing performed by obtainer 11, segmenter 12, detector 13, outputter 14, and reproducer 15. Storage 16 is implemented by semiconductor memory for example, but may be implemented by any known electronic information storage means without limitation. Storage 16 has stored therein segmentation model 17 used by segmenter 12, and detection model 18 used by detector 13.

3. Operations

Figure 13:
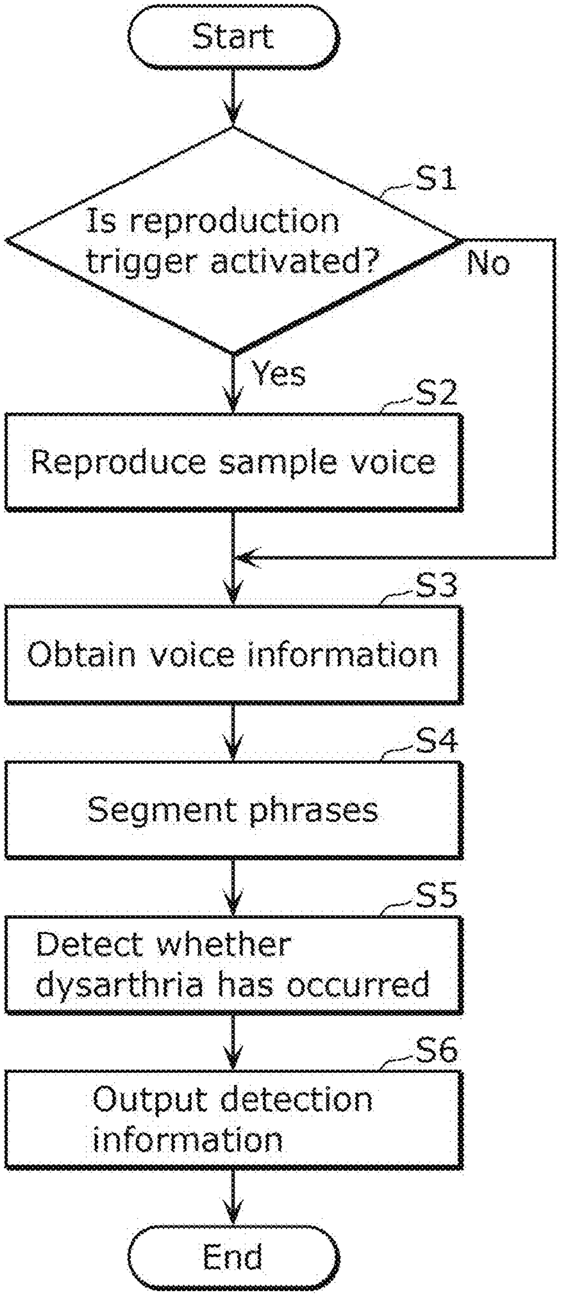
FIG. 13 is a flowchart illustrating exemplary operations of the dysarthria detection device according to the embodiment.
Figure 14:
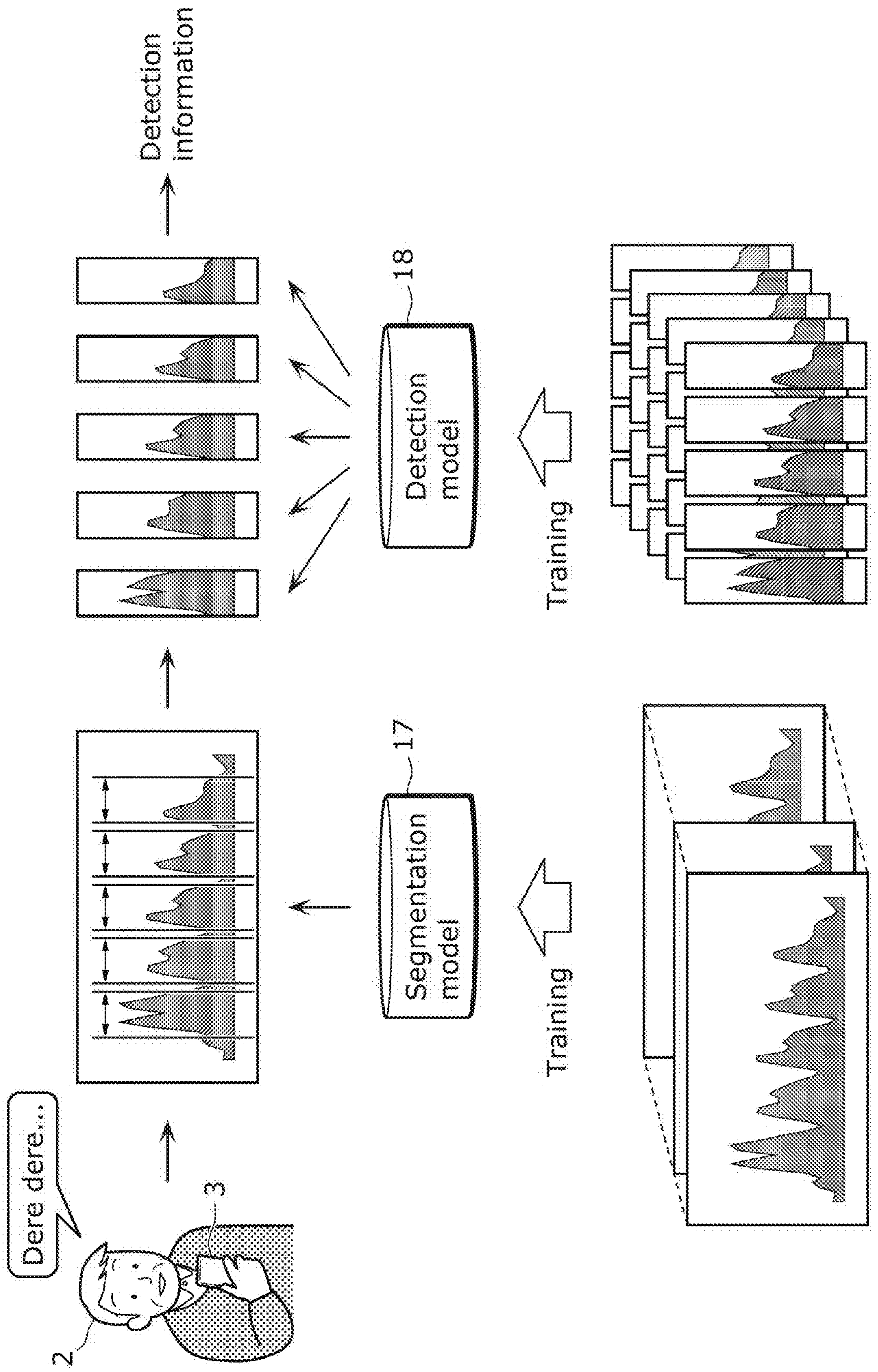
FIG. 14 is a diagram illustrating an example of an overview of the dysarthria detection device and a dysarthria detection method according to the embodiment.
Figure 15:
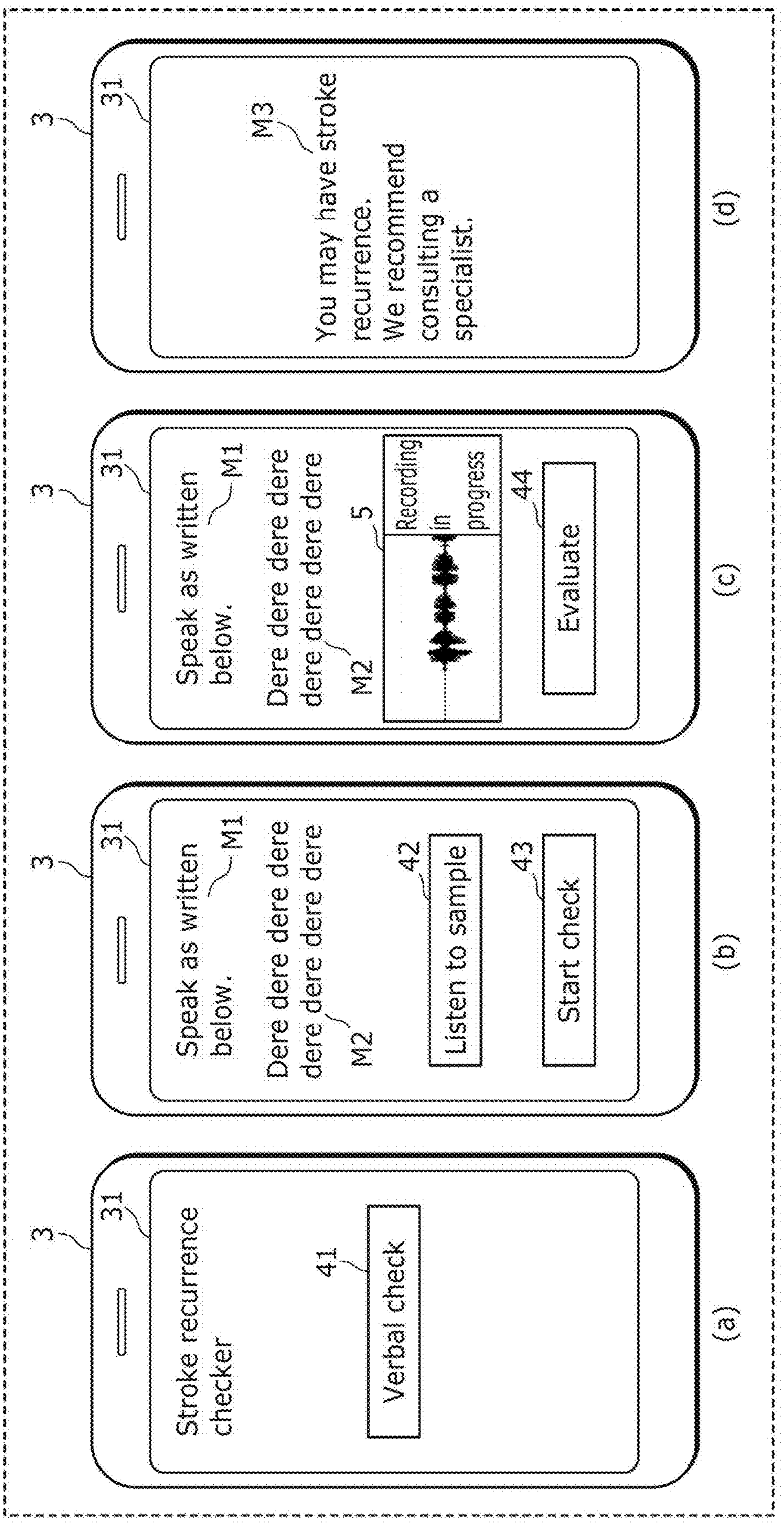
FIG. 15 is a diagram illustrating a specific example of operations of the dysarthria detection device according to the embodiment.

An example of the operations of dysarthria detection device 100 (i.e., an example of the dysarthria detection method) according to the embodiment will be described below with reference to FIGS. 13 to 15. FIG. 13 is a flowchart illustrating exemplary operations of dysarthria detection device 100 according to the embodiment. FIG. 14 is a diagram illustrating an example of an overview of dysarthria detection device 100 and the dysarthria detection method according to the embodiment. FIG. 15 is a diagram illustrating a specific example of operations of dysarthria detection device 100 according to the embodiment.

The following description assumes that, as shown in FIG. 14, segmentation model 17 and detection model 18 both have been trained by machine learning in the above-described manners. The following description also assumes that subject 2 is a mild-case patient who had stroke in the past and has recovered although not completely. It is to be understood that subject 2 may also be a person who has never had stroke.

(a) to (d) in FIG. 15 all illustrate the process of executing the application "stroke recurrence checker" on information terminal 3. (a) in FIG. 15 illustrates an image that appears on display 31 of information terminal 3 upon start-up of the application. Displayed in the center of display 31 is icon 41, which includes the text string "Verbal check." In response to subject 2 performing an operation of selecting icon 41, such as touching icon 41 with a finger, the process transitions to the state illustrated in (b) in FIG. 15.

As illustrated in (b) in FIG. 15, display 31 of information terminal 3 displays text string M1 "Speak as written below." prompting subject 2 to utter a test phrase, and text string M2 "Dere dere dere dere dere dere dere dere" representing the test phrase. Along with text strings M1 and M2, display 31 also displays icon 42 including the text string "Listen to sample" and icon 43 including the text string "Start check."

Here, the operation of selecting icon 42 by subject 2 corresponds to a "reproduction trigger" illustrated in FIG. 13. That is, if subject 2 performs the operation of selecting icon 42, or in other words, if the reproduction trigger is activated (S1: Yes), reproducer 15 (the reproducing step) reproduces sample voice (S2). It is to be noted that icon 42 may appear on display 31 after voice information is obtained, rather than before voice information is obtained. For example, icon 42 may appear on display 31 if the test phrase uttered by subject 2 cannot be detected for some reason, such as the voice uttered by subject 2 being too small. As another example, icon 42 may appear on display 31 if step S4 to be described later fails in the processing of segmenting the voice information into phrases. As a further example, icon 42 may appear on display 31 if step S5 to be described later fails in the processing of detecting whether dysarthria has occurred.

Without subject 2 performing the operation of selecting icon 42 (S2: No), or after subject 2 performs the operation of selecting icon 42, the process transitions to the state illustrated in (c) in FIG. 15 in response to subject 2 performing an operation of selecting icon 43. Icon 43 may be configured to accept the operation by subject 2 (i.e., be activated) only after subject 2 performs the operation of selecting icon 42 and reproduces the sample voice. In this case, the process cannot transition to the state illustrated in (c) in FIG. 15 until subject 2 finishes listening to the sample voice. Icon 43 may also be configured to be grayed out, for example, to indicate inactive mode until the sample voice is reproduced, and to be displayed in white, for example, to indicate active mode once the sample voice is reproduced.

As illustrated in (c) in FIG. 15, display 31 of information terminal 3 still displays text strings M1 and M2. Along with text strings M1 and M2, display 31 displays sub-image 5 indicating that the test phrase being uttered by subject 2 is being recorded, and icon 44 including the text string "Evaluate." Sub-image 5 shows the text string "Recording in progress" and a voice waveform picked up by the microphone of information terminal 3. That is, in the state in (c) in FIG. 15, obtainer 11 (the obtaining step) obtains the voice information (S3).

In response to subject 2 performing an operation of selecting icon 44, a series of processing steps for determining (detecting) whether subject 2 has dysarthria is started. First, segmenter 12 (the segmenting step) segments the voice information obtained by obtainer 11 (the obtaining step) into phrases (S4). Detector 13 (the detecting step) inputs each of the phrases segmented by segmenter 12 (the segmenting step) into detection model 18 to detect whether subject 2 has dysarthria (S5). Outputter 14 outputs detection information regarding whether subject 2 has dysarthria (S6), detected by detector 13 (the detecting step). Specifically, as illustrated in (d) in FIG. 15, the detection information appears on display 31 of information terminal 3 as text string M3. Here, text string M3 "You may have stroke recurrence. We recommend consulting a specialist." is displayed as the detection information if dysarthria is detected in subject 2, or in other words, if there is a sign of the onset of stroke in subject 2. If subject 2 has no dysarthria, or in other words, if there is no sign of the onset of stroke in subject 2, a text string such as "Nothing abnormal is detected." for example, appears on display 31.

Figure 16:
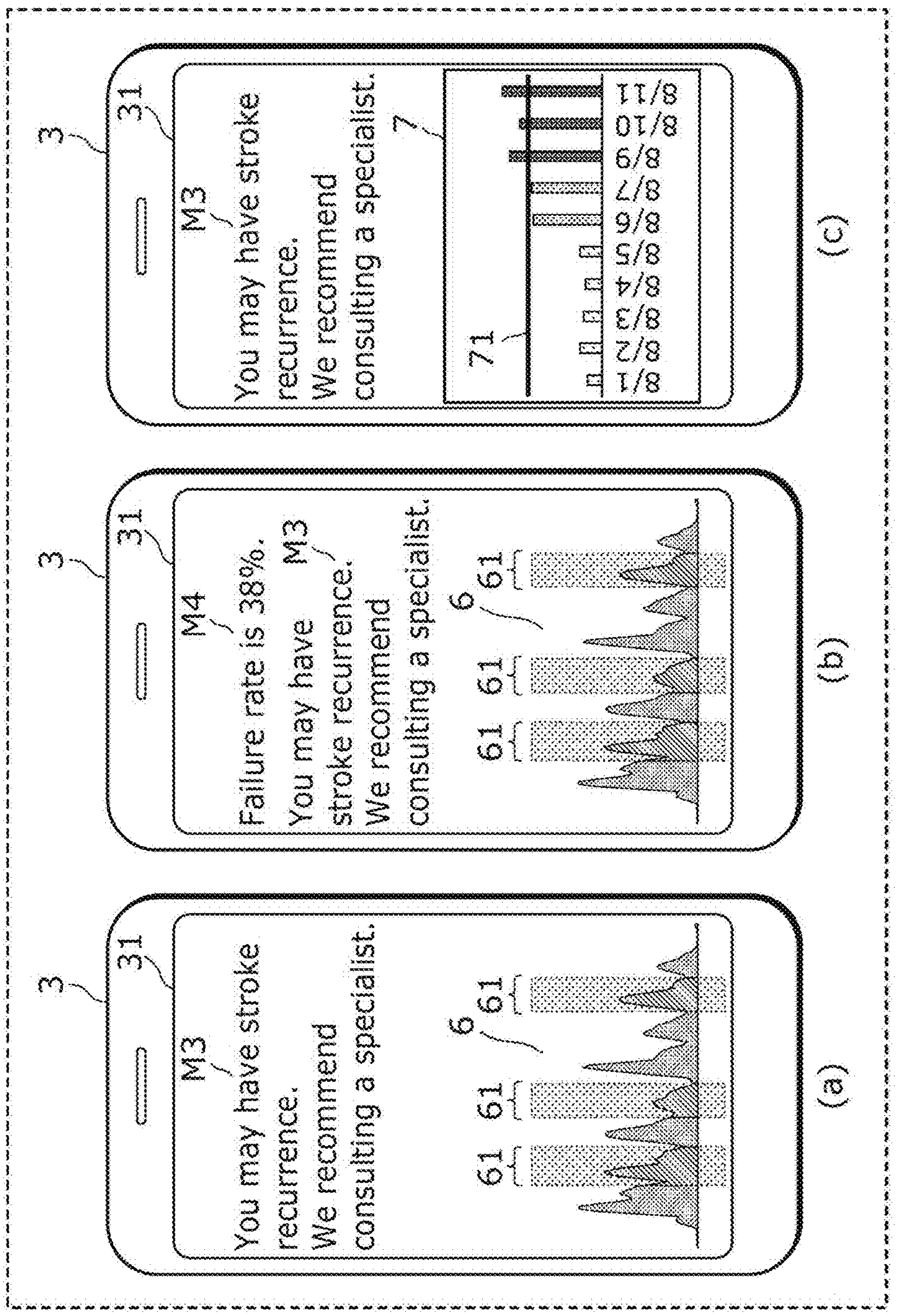
FIG. 16 is a diagram illustrating other specific examples of operations of the dysarthria detection device according to the embodiment.

Alternatively, the detection information may be displayed on display 31 of information terminal 3 in the forms illustrated in FIG. 16, for example. FIG. 16 is a diagram illustrating other specific examples of operations of dysarthria detection device 100 according to the embodiment.

In the example illustrated in (a) in FIG. 16, the detection information is displayed on display 31 as text string M3 and first graph 6. First graph 6, which represents an RMS envelope obtained from a voice waveform of subject 2, includes failure sections 61 in which subject 2 failed to accurately utter phrases (in other words, in which dysarthria is observed). By looking at first graph 6, subject 2 can recognize which phrases were uttered incorrectly.

In the example illustrated in (b) in FIG. 16, the detection information is displayed on display 31 as text string M3, first graph 6, as well as text string M4 "Failure rate is 38%." Text string M4 shows the ratio of failure sections 61 (i.e., the failure rate) to the entire range in which subject 2 uttered voice. By looking at text string M4, subject 2 can recognize how high the possibility is that stroke has recurred.

In the example illustrated in (c) in FIG. 16, the detection information is displayed on display 31 as text string M3 and second graph 7. Second graph 7 is a bar graph representing the failure rate over time. Second graph 7 here shows the results of executing the stroke recurrence checker every day during the period from August 1st to 11th. Horizontal line 71 in second graph 7 represents a threshold; failure rates above the threshold indicate a high possibility that stroke has recurred. By looking at second graph 7, subject 2 can recognize, on a time-series basis, how high the possibility is that stroke has recurred.

As above, dysarthria detection device 100 and the dysarthria detection method according to the embodiment enable detecting, from voice uttered by subject 2, whether dysarthria has occurred and further whether there is a sign of the onset of stroke, without relying on a specialist such as a doctor or a speech-language-hearing therapist. If a sign of the onset of stroke in subject 2 is detected using dysarthria detection device 100 and the dysarthria detection method according to the embodiment, subject 2 may be advised to immediately see a doctor. This will lead to early treatment that prevents the disease from becoming serious.

4. Advantageous Effects

As described above, the dysarthria detection method according to the embodiment includes the obtaining step (S3) and the detecting step (S5). At the obtaining step (S3), voice information regarding voice uttered by a subject is obtained. At the detecting step (S5), whether the subject has dysarthria is detected based on an output result obtained by inputting the voice information obtained at the obtaining step (S3) into detection model 18, trained by machine learning to output information regarding whether the subject has dysarthria by using the voice information inputted.

Thus, whether the subject has dysarthria can be detected simply from the voice uttered by the subject. This advantageously facilitates detecting whether the subject has dysarthria without imposing burdens on the subject, compared with a case where the subject is to capture the subject's own face with a video camera.

In the dysarthria detection method according to the embodiment, the voice information includes a specific sound uttered by the subject moving the subject's tongue in a predetermined pattern.

Thus, the degree of tongue paralysis, which can be an indicator of whether dysarthria has occurred, can readily be detected. This advantageously facilitates detecting whether the subject has dysarthria, compared with a case where the voice information does not include the specific sound.

In the dysarthria detection method according to the embodiment, the specific sound is a tap sound.

Thus, the specific sound includes a tap sound, which is difficult to utter with a paralyzed tongue. This advantageously further facilitates detecting whether the subject has dysarthria.

In the dysarthria detection method according to the embodiment, the voice information includes a phrase in which the specific sound and a plosive sound are consecutive.

Thus, a plosive sound, which is readily located in the voice uttered by the subject, is consecutive with the specific sound to facilitate locating the specific sound in the voice uttered by the subject. This advantageously further facilitates detecting whether the subject has dysarthria.

In the dysarthria detection method according to the embodiment, the voice information includes multiple phrases each being the above phrase. The dysarthria detection method according to the embodiment further includes the segmenting step (S4) of segmenting the voice information obtained at the obtaining step into the phrases (S3). In the detecting step (S5), each of the phrases segmented at the segmenting step (S4) is inputted into detection model 18.

This advantageously further facilitates detecting whether the subject has dysarthria, compared with a case where a single phrase is used to detect whether the subject has dysarthria.

In the dysarthria detection method according to the embodiment, at the segmenting step (S4), the phrases are segmented from a Root Mean Square (RMS) envelope or a spectrogram as the voice information.

Thus, an RMS envelope or a spectrogram tends to show distinctive characteristics that allow distinguishing between the phrases. This will advantageously improve the accuracy of segmenting the voice information into the phrases.

In the dysarthria detection method according to the embodiment, at the segmenting step (S4), the phrases are segmented by inputting the voice information obtained at the obtaining step (S3) into segmentation model 17, trained by machine learning to segment the voice information inputted into the phrases.

This will advantageously improve the accuracy of segmenting the voice information into the phrases, compared with a case where the phrases are segmented without using segmentation model 17.

In the dysarthria detection method according to the embodiment, detection model 18 is an autoencoder, trained by machine learning to receive voice information regarding voice uttered by a person without dysarthria and restore voice information identical to the voice information received. At the detecting step (S5), whether the subject has dysarthria is detected based on the degree of deviation between the voice information inputted into detection model 18 and the voice information outputted from detection model 18.

Thus, a large amount of training data can readily be provided, compared with a case where detection model 18 is trained using voice of patients with dysarthria, who are fewer in number than people without dysarthria. This advantageously facilitates training detection model 18.

The dysarthria detection method according to the embodiment further includes the outputting step (S6) of outputting the information regarding whether the subject has dysarthria, detected at the detecting step (S5).

Thus, the information detected may be outputted for the subject, for example. This advantageously enables the subject to know whether the subject has dysarthria.

The dysarthria detection method according to the embodiment further includes, before the obtaining step (S3), the reproducing step (S2) of reproducing, for the subject, sample voice of the voice uttered by the subject.

Thus, whether the subject has dysarthria, including whether the subject can utter voice to imitate the sample voice, can be detected. This will advantageously improve the accuracy of detecting whether the subject has dysarthria.

Dysarthria detection device 100 according to the embodiment includes obtainer 11 and detector 13. Obtainer 11 obtains voice information regarding voice uttered by a subject. Detector 13 detects whether the subject has dysarthria, based on an output result obtained by inputting the voice information obtained by obtainer 11 into detection model 18, trained by machine learning to output information regarding whether the subject has dysarthria by using the voice information inputted.

Thus, whether the subject has dysarthria can be detected simply from the voice uttered by the subject. This advantageously facilitates detecting whether the subject has dysarthria without imposing burdens on the subject, compared with a case where the subject is to capture the subject's own face with a video camera.

Other Embodiments

Although the dysarthria detection method and dysarthria detection device 100 according to aspects of the present disclosure have been described based on an embodiment, the present disclosure is not limited to this embodiment. Those skilled in the art will readily appreciate that embodiments arrived at by making various modifications to the above embodiment or embodiments arrived at by selectively combining elements disclosed in the above embodiment without materially departing from the scope of the present disclosure may be included within one or more aspects of the present disclosure.

For example, although segmenter 12 (the segmenting step) in the above embodiment uses segmentation model 17 to segment the voice information into the phrases, this is not limitative. Segmenter 12 (the segmenting step) may, for example, segment the voice information into the phrases so that the phrases are separated at positions where the power decreases to or below a predetermined value in the RMS envelope obtained from the subject's voice waveform. In this case, segmentation model 17 is not required.

As another example, although multiple phrases are adopted in the above embodiment as the test phrase to be uttered by the subject (i.e., the voice information obtained by obtainer 11), the test phrase may be a single phrase. In this case, segmenter 12 (the segmenting step) is not required.

In the above embodiment, "dere dere dere . . . " is adopted as the test phrase to be uttered by the subject (i.e., the voice information obtained by obtainer 11). However, this is not limitative, and the test phrase may include any phrase in which a plosive sound and a tap sound are consecutive. The test phrase is also not necessarily to include such a phrase in which a plosive sound and a tap sound are consecutive, but may include a phrase formed of only a tap sound. Depending on how detection model 18 is trained, the test phrase may not need to include a tap sound, and further may not need to include a specific sound uttered by moving the tongue in a predetermined pattern.

In the above-described embodiment, dysarthria detection device 100 is provided to an information terminal, but the present disclosure is not limited to the embodiment. For example, dysarthria detection device 100 may be provided to a server device. The server device may be a cloud server or a local server. In this case, a processor in the server device may execute a predetermined program to implement dysarthria detection device 100. Furthermore, in this case, the subject may access the server device by using the information terminal via a network or the like. As another example, it is also possible that a part of elements in dysarthria detection device 100 may be provided to the information terminal, and the other part is provided to the server device.

Furthermore, dysarthria detection device 100 may be stored not in a general-purpose information terminal, such as a smartphone or a tablet terminal, but in a device as a dedicated terminal having a dysarthria detection function. In this case, a processor provided to the device as the dedicated terminal executes a predetermined program to implement dysarthria detection device 100.

Moreover, some or all of the elements included in dysarthria detection device 100 may be realized via a single system large scale integrated (LSI) circuit. A system LSI circuit is a multifunctional LSI circuit manufactured by integrating a plurality of units on a single chip, and is specifically a computer system including, for example, a microprocessor, ROM (Read Only Memory), and RAM (Random Access Memory). A computer program is stored in the ROM. The system LSI circuit achieves its function as a result of the microprocessor operating according to the computer program.

Note that here, the terminology "system LSI circuit" is used, but depending on the degree of integration, the circuit may also be referred to as IC, LSI circuit, super LSI circuit, or ultra LSI circuit. Moreover, the method of circuit integration is not limited to LSI. Integration may be realized with a specialized circuit or a general purpose processor. After the LSI circuit is manufactured, a field programmable gate array (FPGA) or a reconfigurable processor capable of reconfiguring the connections and settings of the circuit cells in the LSI circuit may be used.

Further, when development of a semiconductor technology or another derived technology provides a circuit integration technology which replaces LSI, as a matter of course, functional blocks may be integrated by using this technology.

For example, one aspect of the present disclosure may be implemented to a computer program for causing a computer to execute each characterized step included in the dysarthria detection method. Another aspect of the present disclosure may be implemented to a non-transitory computer-readable recording medium storing such a computer program. In other words, the program may cause one or more processors to execute the above-described dysarthria detection method.

Thus, whether the subject has dysarthria can be detected simply from the voice uttered by the subject. This advantageously facilitates detecting whether the subject has dysarthria without imposing burdens on the subject, compared with a case where the subject is to capture the subject's own face with a video camera.

INDUSTRIAL APPLICABILITY

The present disclosure is applicable to, for example, methods for determining whether there is a sign of the onset of stroke.

The invention claimed is:

1. A dysarthria detection method comprising:

obtaining voice information regarding voice uttered by a subject;

generating an output result by a detection model receiving, as an input, the voice information obtained in the obtaining, the detection model having been trained by machine learning to output, as the output result, information regarding whether the subject has dysarthria by using the voice information received; and detecting whether the subject has dysarthria based on the output result, wherein the voice information includes a plurality of phrases in each of which a specific sound and a plosive sound are consecutive, the specific sound being uttered by the subject moving a tongue of the subject in a predetermined pattern, the dysarthria detection method further comprises segmenting the voice information obtained in the obtaining into the plurality of phrases at a location of the plosive sound, and in the generating, each of the plurality of phrases generated by the segmenting is received by the detection model as the input.

2. The dysarthria detection method according to claim 1, wherein the specific sound is a tap sound.

3. The dysarthria detection method according to claim 1, wherein the segmenting of the plurality of phrases is performed based on a Root Mean Square (RMS) envelope or a spectrogram as the voice information.

4. The dysarthria detection method according to claim 1, wherein the segmenting of the plurality of phrases is performed by inputting the voice information obtained in the obtaining into a segmentation model that has been trained by machine learning to segment voice information inputted into the plurality of phrases.

5. The dysarthria detection method according to claim 1, wherein the detection model is an autoencoder model that has been trained by machine learning to receive voice uttered by a person without dysarthria and restore voice identical to the voice received, and the detecting whether the subject has dysarthria is performed based on a degree of deviation between the voice information inputted into the detection model and the voice information outputted from the detection model.

6. The dysarthria detection method according to claim 1, further comprising:

outputting detection information regarding whether the subject has dysarthria which is detected in the detecting.

7. The dysarthria detection method according to claim 1, further comprising reproducing, for the subject, sample voice of voice to be uttered by the subject.

8. A non-transitory computer-readable recording medium having recorded thereon a computer program for causing a computer to execute the dysarthria detection method according to claim 1.

9. The dysarthria detection method according to claim 1, wherein the detection model is an autoencoder model that has been trained by machine learning to restore voice identical to voice that has been uttered by a person without dysarthria and inputted to the detection model.

10. The dysarthria detection method according to claim 1, wherein the detecting whether the subject has dysarthria is performed based on a degree of deviation between the voice information inputted into the detection model and the voice information outputted from the detection model.

11. The dysarthria detection method according to claim 1, further comprising:

displaying, on a display, a text string representing a test phrase to prompt the subject to utter voice.

12. The dysarthria detection method according to claim 7, wherein in the reproducing, when a predetermined operation performed by the subject is received by an information terminal, the sample voice is reproduced from a speaker provided on the information terminal to the subject.

13. The dysarthria detection method according to claim 6, wherein in the outputting of the detection information, a failure rate is displayed on a display, the failure rate being a ratio of a failure section in entire sections in which the subject has uttered voice, the failure section being a section in which the subject has failed to accurately utter a phrase.

14. A dysarthria detection device comprising:

a processor that obtains voice information regarding voice uttered by a subject, and detects whether the subject has dysarthria; and a memory that stores a detection model that has been trained by machine learning to output information regarding whether the subject has dysarthria by using voice information received as an input, wherein the detection model generates an output result by receiving, as the input, the voice information obtained by the processor, the processor detects whether the subject has dysarthria based on the output result, the voice information includes a plurality of phrases in each of which a specific sound and a plosive sound are consecutive, the specific sound being uttered by the subject moving a tongue of the subject in a predetermined pattern, in the obtainment of the voice information, the processor segments the obtained voice information into the plurality of phrases at a location of the plosive sound, and in the generation of the output result, each of the plurality of phrases generated by the segmenting of the obtained voice information at the location of the plosive sound is received by the detection model as the input.

* * * * *